April 4, 1961 E. R. MAURER ET AL 2,978,173

SCANNER DRUM

Filed May 29, 1959 3 Sheets-Sheet 1

INVENTORS
ERWIN R. MAURER
GEORGE MICKLUS
BY Carl C. Kling
ATTORNEY

United States Patent Office 2,978,173 Patented Apr. 4, 1961

2,978,173

SCANNER DRUM

Erwin R. Maurer, Hopewell Junction, and George Micklus, Poughkeepsie, N.Y., assignors to International Business Machines Corporation, New York, N.Y., a corporation of New York Filed May 29, 1959, Ser. No. 816,952

11 Claims. (Cl. 235—61.11)

This invention relates to a record card information processing, and particularly to a drum for holding a record card for repetitive scanning.

Record card accounting systems are remarkable for their versatility. The plugboard, which allows the machine operator to rewire internal machine circuits for changing machine operation, has long been known. It has also been known to use the record card itself as a control unit; this scheme has found wide acceptance as a program unit in a card punch, for example. The program unit, comprises a drum and a card wrapped longitudinally around the surface of the drum, which moves synchronously with the card being punched, column-by-column, to provide control signals as holes in the program card are sensed. The card punch program drum moves at a relatively slow speed, and presents not more than five or six holes to be sensed at one time, which causes negligible drag.

It has been proposed to use a record card as an interrogation unit for row-by-row sensing of a "question" card in a card scanner, a sorter-type machine where cards are read 80 columns at a time at high speed. This suggests a scanning device to carry the question card past a sensing station repetitively at high speed for parallel reading of many columns of data.

The standard record card layout does not lend itself well to repetitive parallel reading on a rotating drum. The card is 3.25 inches in width by 7.375 inches long, with margins of only .1875 inch around the punching area. Even if a space of .5 inch to represent the space between cards in the scanner is allowed, the drum can have a circumference of only 3.75 inches, a radius of only .6 inch. This standard record card has a number of discrete data positions disposed in longitudinal rows and vertical columns—where rectangular punches and Hollerith code are used, there are 960 punch positions arranged in 80 columns of twelve positions designated 12, 11, 0, 1, 2, 3, 4, 5, 6, 7, 8, 9.

For proper operation as a record card holder, the scanner drum must hold the scan card in perfect registration without slippage at high speeds, and without interfering with reading brushes or other sensing means. A full set of 80 reading brushes provides a heavy drag which tends to pull the scan card loose from its moorings. For brush reading applications the drum must have a conductive surface. Certain applications require logical division of the scan card into several fields of data. To prevent short or back circuits during reading of a plurality of such fields concurrently it is desirable to insulate the conductive surface from the machine frame and divide it into several sections which are electrically insulated from one another. This division introduces additional mechanical problems in holding the card on the drum without shorting two or more fields together.

The prior art, possibly because of the scope of the mechanical problems involved in holding a scan card, has avoided the use of a card scanner in combination with a high-speed sorter. Mechanical switches in card image, plugboards and commutators have been used, with a loss of the convenience inherent in the use of the card as a control unit.

Relatively expensive storage units, which retain an image of a card as it is read, have been suggested, but tend to be avoided because of the cost. The need for an inexpensive, practicable device for holding a record card for repetitive parallel scanning has not been satisfied by prior art.

*Principal features of the invention*

The card to be scanned is wrapped around a drum, the card forming an incomplete cylinder which is completed by a spring-loaded wedge clamp which holds the card to the drum. The clamp is lifted up slightly by a lever and cam mechanism for insertion of one edge and then for the other edge of the card. With the edge of the card in place, and the lever and cam mechanism returned to normal, clamping springs pull the clamp toward the card and the body of the drum, clamping the edge of the card in place. A dummy punch pin is used in one or more predetermined positions, such as the 9 position in columns 1 and 80, to cooperate with prepunched locating holes in the scan card to provide proper registration. A pair of locking rings at the left and right ends of the drum are rotatable by the operator to provide a positive lock to the clamp. Balance rods are used to offset the added weight of the clamp, preventing noise and harmful oscillations.

The scanner drum assembly comprises an insulating core, a conductive surface, and a clamp mechanism. It is made by assembling the scanner drum, clamping a dummy card in place, and grinding the clamp to form a smooth cylinder with the card, which makes possible high-speed reading by brushes without undue wear.

*Objects*

The object of the invention is to hold a scan card rotating repetitively at high speed past sensing means.

Another object is to provide for repetitive parallel reading of many columns of data recorded on a record card.

A feature is a clamp which forms a smooth cylinder with the scan card to allow brush reading of the scan card with a minimum of wear.

The foregoing and other objects, features and advantages of the invention will be apparent from the following more particular description of a preferred embodiment of the invention, as illustrated in the accompanying drawings.

Figure 1:
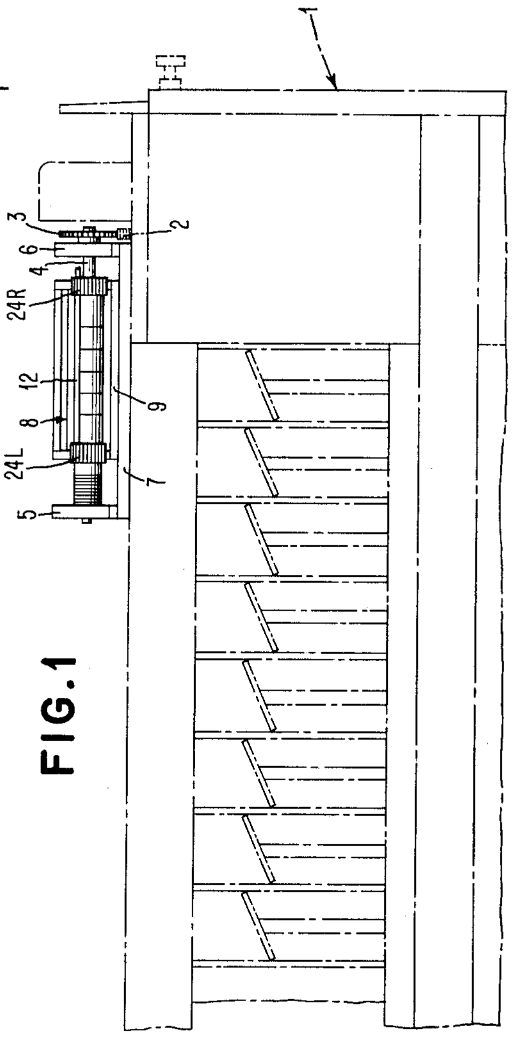
Fig. 1 is a front elevation view of the scanner drum attached to a statistical sorter which is shown in phantom.

Fig. 1 illustrates a statistical sorter 1, with the scanner drum of this invention mounted on top. Connecting gear 2, connecting with the main drive shaft of the sorter, provides a synchronous drive to the scanner drum through gear 3. Scanner drum shaft 4, which is driven by gear 3, is journalled in pad bearings 5 and 6, which are mounted upon base 7. Brush block 8 is mounted upon brush block base 9, to hold reading brushes in position to read the card.

Figure 2:
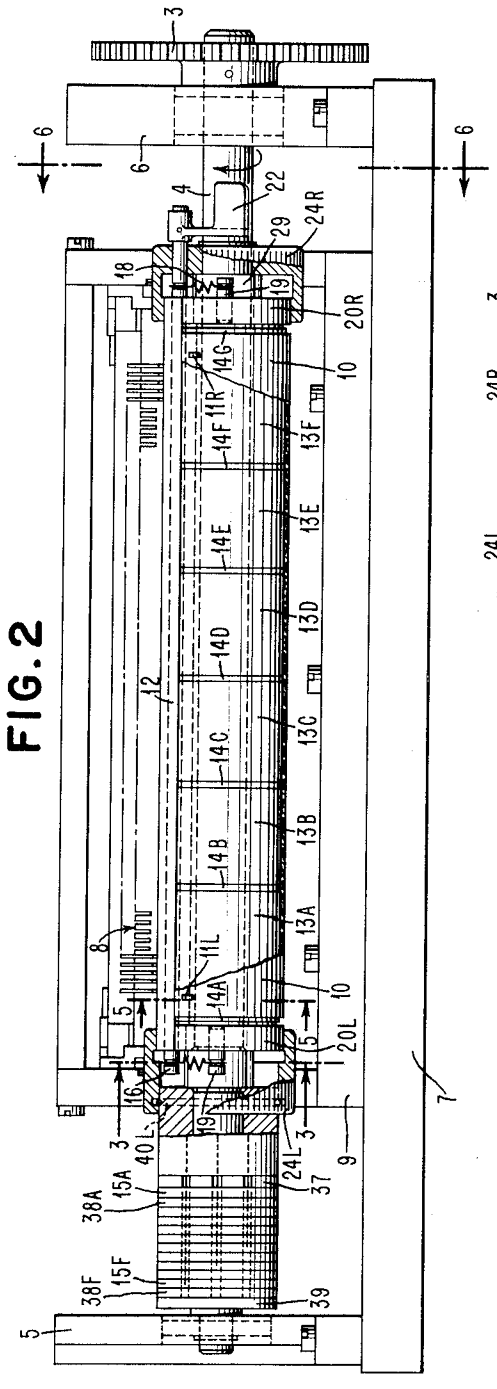
Fig. 2 is a front elevational view of the scanner drum shown partially in section.

Fig. 2 illustrates card 10 held in registration on locating pins 11L and 11R and clamped tightly around the body portion of the drum by clamp 12. The surface of the scanner drum is made up of six conducting surfaces or fields, 13A–13F, insulated from each other by insulating segments 14A–14G; each field is connected electrically to the similarly lettered commutator ring 15A–15F. When properly mounted and clamped to the scanner drum, the card may be repetitively scanned by the brushes in brush block 8 as the drum rotates, and compared with a card being read simultaneously, index point by index point, by the sorter 1 (see Fig. 1). The scan card 10 on the scanner drum is read by circuit through commutator rings 15A–15F, connecting wires, conductive fields 13A–13F, the holes in the card 10, and the brushes in brush block 8. Fields 13A–13F are in complete electrical isolation from each other, which allows reading each field separately without danger of back circuits from other fields.

Figure 3:
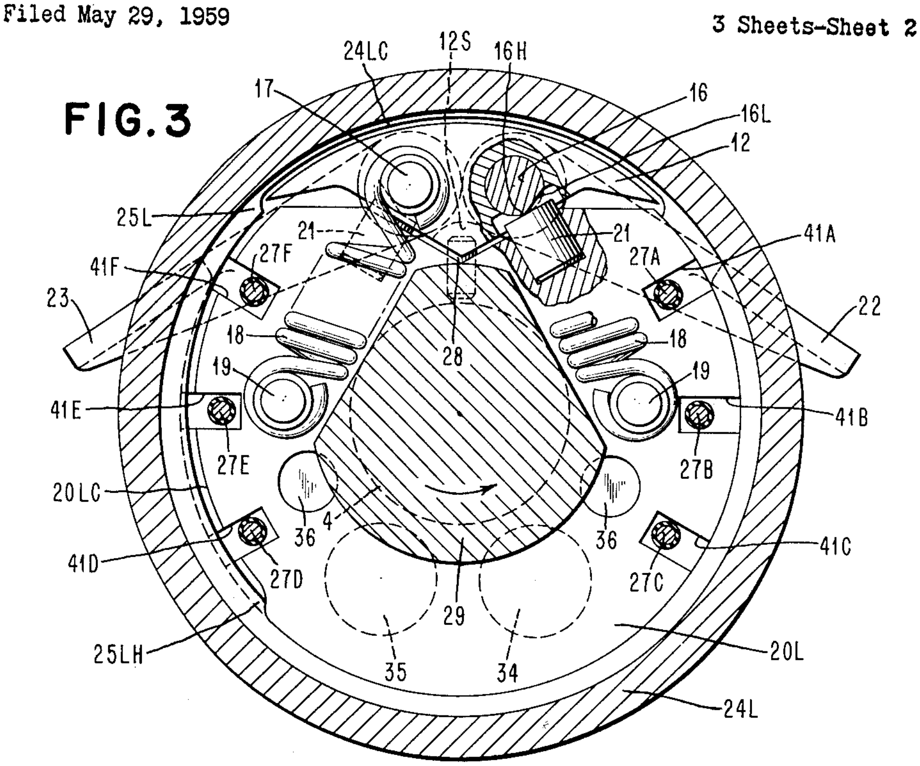
Fig. 3 is an enlarged sectional view taken along the lines 3—3 of Fig. 2 shown in open position without a card.
Figure 4:
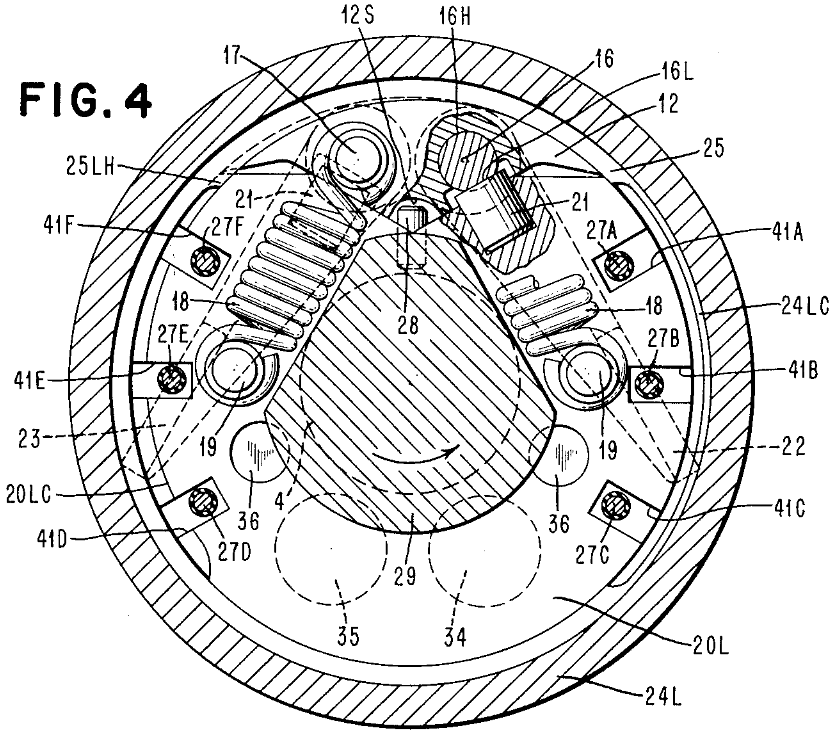
Fig. 4 is an enlarged sectional view taken along the line 3—3 of Fig. 2 showing the mechanism in a closed position without a card.

Figs. 3 and 4 illustrate the card clamping and locking mechanism at the left end of the drum; the right end is similar. Clamp 12 has inserted completely through it the leading edge cam rod 16 and trailing edge cam rod 17. Clamping springs 18 are held on studs 19 of metal core collar 20L and 20R (Fig. 2) and the cam rods 16 and 17 to bias clamp 12 toward the clamping position. Cam driver pads 21 are securely imbedded in core collar 20L and positioned so that clamp 12 may be closed when the low dwells of cam rods 16 and 17 are against their respective cam driver pads, as shown in Fig. 4. Leading edge handle 22 and trailing edge handle 23 are pinned to the leading edge cam rod 16 and trailing edge cam 17, respectively, at the right end of the drum. When the handles are positioned as in Fig. 3, the cam rods present their high dwells to their respective cam driver pads 21, driving clamp 12 to the open position as shown in Fig. 3. The low dwells 16L and 17L of cam rods 16 and 17 are simply milled-away portions; the high dwells 16H and 17H are the normal curvature of the cam rods. The leading edge of clamp 12 opens and closes, under control of cam rod 16, independent of the opening and closing of the trailing edge by cam rod 17. After the scan card is inserted and registered on locating pins 11L and 11R (not shown in Fig. 3 and 4, see Figs. 2 and 5), handle 22 is moved to the position shown in Fig. 4, allowing clamping springs 18 to pull clamp 12 toward clamping position for the leading edge; the trailing edge is then inserted and handle 23 is moved to clamp the trailing edge of the card. This temporarily locks the card on the scanner drum; continued high-speed rotation past a full set of brushes, however, would tend to tear the card loose from the spring biased clamp 12. A pair of locking rings 24R and 24L are therefore provided (see Fig. 2), having locking ring cam portions 25L and 25R (Figs. 3 and 4) to provide a positive drive toward clamping position. Locking ring cam portions 25L and 25R have their high dwells, 25LH (Figs. 3 and 4) and 25RH (not shown) at the end opposite to the counterclockwise direction of rotation of the drum, as shown by the arrows, so that the inertia of the locking rings 24L and 24R will tend to keep the clamp 12 locked. Locking rings 24L and 24R are each provided with a cutout or relieved portion 24LC (Figs. 3 and 4) or 24LR (not shown) to allow opening of the clamp, as shown in Fig. 3. Core collars 20L and 20R are provided with cutout or relieved portions 20LC (Figs. 3 and 4) and 20RC (not shown) to provide room for the respective locking ring cams 25L and 25R when the rings are positioned as in Fig. 3. Drum core 26 (see Fig. 5) is composed of insulating material to support conductive fields 13A–13F (see Fig. 2). Six slots 41A–41F are cut along the length of drum core 26 and through core collars 20L and 20R to provide access by wires 27A–27F to conductive fields 12A–13F (Fig. 2). Stud 28 (Fig. 4) which extends from core collar 20L, fits tightly in a slot 12S in clamp 12 to prevent longitudinal excursions of the clamp while allowing a rocking motion as first one edge, then the other of the clamp is moved to open position. Shaft bumper 29 (Fig. 4) is the base of longitudinal locationing of parts during assembly.

Figure 5:
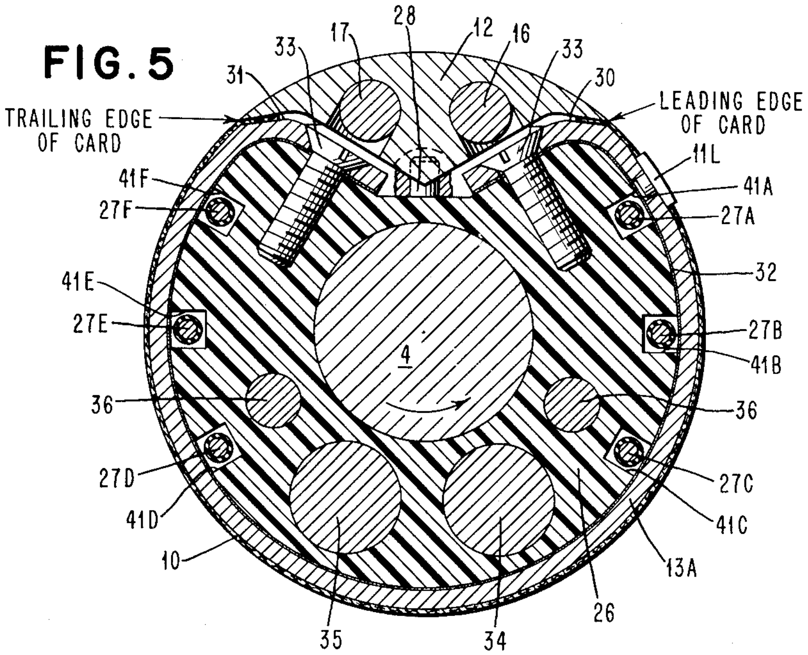
Fig. 5 is an enlarged sectional view taken along the line 5—5 of Fig. 2 showing the scanner drum with a card in the locked position.

Fig. 5 is a section through the card reading portion of the drum, showing the card 10 clamped tightly around conductive field 13A, which is affixed to insulated drum core 26. The card is held by clamp 12 against flat edges 30 and 31 which have been machined at the clamping areas of the fields 13A–13F. Clamp 12 is undercut slightly so that the clamp makes contact with the card along a line rather than flat surface to flat surface; the flat edges provide an angle with the cylindrical portion of the conductive fields to force a fold in the scan card, which increases gripping power of clamp 12. Clamp 12, together with the scan card 10, forms a smooth cylinder of circular cross-section. The radius of curvature of the surface of clamp 12 is greater by the thickness of the card than the radious of curvature of the body portion of the drum. Conductive field 13A and conductive fields 13B–13F (see Fig. 2) are held to the drum core 26 by a layer of cement 32 and by screws 33. Balance rods 34 and 35 equalize the weight of clamp 12 to prevent oscillations which might impair reading or damage the device at the speeds called for. Pins 36 are assembly pins which prevent relative rotation of parts.

Fig. 5 illustrates the placement of locating pin 11L. A slot of width equal to that of the pin is milled in field 13A, at the position corresponding to the punch in column 1 of the scan card. A hole is drilled through the thickness of the field 13A to accommodate the shank of pin 11, which is press-fitted into position. Should certain applications require different pin placement, similar slots and holes in other locations may accept the pins.

Figure 6:
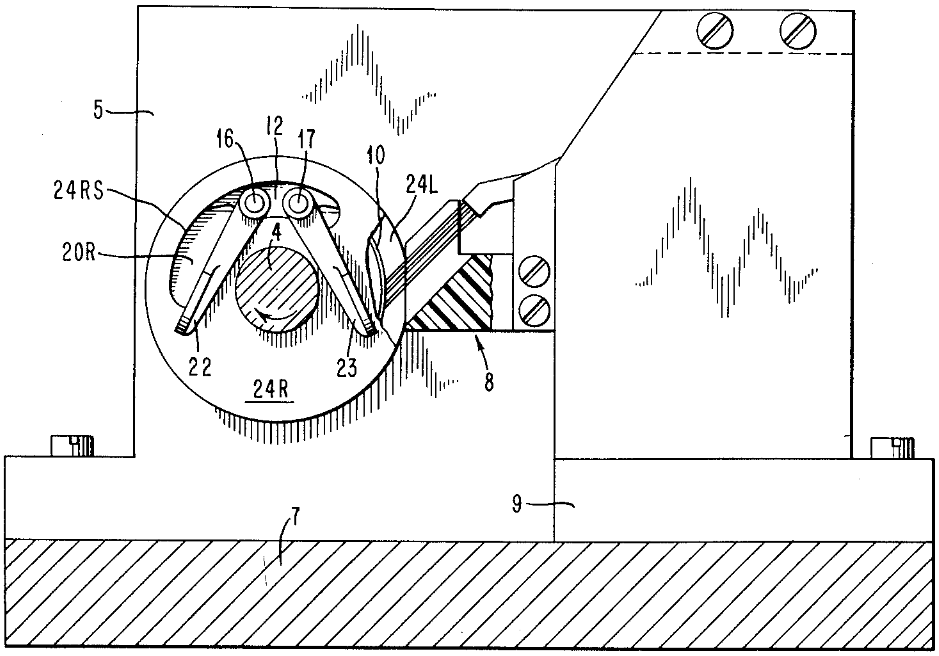
Fig. 6 is a right-end view partly in cross section taken along the line 6—6 of Fig. 2.

Fig. 6 is an end view illustrating the relationship between brush block 8 and the scanner drum. Locking ring 24R has an arcuate slot 24RS through which cam rods 16 and 17 extend, which allows locking ring 24 to be rotated without interfering with cam rods 16 and 17 or handles 22 or 23.

*Assembly method*

The scanner drum being a relatively long cylinder with many parts, it is much less difficult to assemble the drum core than to mold it in one piece. The core is made up of several short cylindrical segments cemented together; each segment is shaped as shown in Fig. 5, and is approximately 1.5 inches in length. After the segment is molded, holes for the balance rods, drive shaft and assembly pins are drilled, slightly smaller than required. One hole for a balance rod is then reamed out to full size, and all segments are assembled and cemented on the balance rod. Other holes then are reamed out to full size. A wedge-shaped volume is milled out to provide room for clamp 12. Slots 41A–41F for the wires 27A–27F are routed, and holes for screws 33 are drilled and tapped.

Core collar 20L (Fig. 2) is press-fitted against shaft bumper 29 (Fig. 3). The core assembly is then pushed onto the shaft against collar 20L, locked against rotation by the assembly pins 36, and locked in place longitudinally by a second core collar 20R (Fig. 2) press-fitted upon shaft 4. The surface of the assembly is next ground to the shape of smooth cylinder, excepting of course the milled and routed areas. Insulating segment 14A (Fig. 2) is cemented in place. Conductive fields 13A–13F are plates composed of copper-silver eutectic alloy, pre-formed to the shape illustrated in Fig. 5. Wires 27A–27F are cut to precise lengths required to connect the associated commutator rings 15A–15F and conductive fields 13A–13F. Wire 27A is soldered to the 13A field, which is then slid over the gear end of the shaft, up onto the left end of the drum core, which has been coated with cement, against core collar 20L, and affixed in place with screws 33. The wire is threaded through collar 20L and insulating bushing 37, which is slipped over the commutator end of the shaft 4 against shaft bumper 29. Commutator ring 15A is slipped over bushing 37 to its shoulder, and soldered to the wire 29A. Insulating segment 14B is slipped over the gear end of the shaft and cemented to the core; commutator insulating ring 38A is slipped over bushing 37 and the process is then repeated for fields 13B, 13C, 13D, and 13E, which are separated by insulating segments 14B, 14C, 14D, 14E, 14F and 14G, and for commutator rings 15B, 15C, 15D, 15E, and 15F, which are separated by commutator insulating rings 38B, 38C, 38D, 38E and 38F, and locked in place by fitting 39. The surface of the drum assembly is then ground to the form of a smooth cylinder, and the clamp mechanism assembled in place. Locking ring 24L is slipped over the commutator, bushing and collar and snapped in place on snap ring 40L (Fig. 2). Locking ring 24R is held in place similarly by a retaining ring snapped onto the shaft 4. The cam rod handles 22 and 23 are then pinned to the cam rods 16 and 17, respectively.

A dummy card is registered on the locating pins and clamped down. The surface of the clamp, and of the locating pins, is finally ground to form a smooth cylinder with the card, which allows reading brushes to ride right over the clamp without excessive wear, noise, or arcing.

While the invention has been particularly shown and described with reference to a preferred embodiment thereof, it will be understood by those skilled in the art that various changes in form and details may be made therein without departing from the spirit and scope of the invention.

What is claimed is:

1. A drum for holding a scan card for repetitive parallel scanning comprising: an incomplete-cylindrical body portion around which the scan card may be wrapped, said body portion having a longitudinal cutout portion with edges within the cylinder upon which portions of the longitudinal margins of the scan card fall when the card is registered; a clamp member to clamp the scan card margin portions to said edge of said body portion, said clamp member having a cylindrical outside surface to complete a cylinder, with the outside surface of the scan card; means to bias said clamp toward said body portion for clamping; and opening means to open said clamp for loading.

2. A drum as described in claim 1, wherein said body portion comprises an insulating central core, a plurality of conductive fields disposed on the surface of said core, and a plurality of insulating segments separating said conductive fields.

3. A drum as described in claim 1, wherein said clamp member has a longitudinally extending hole; said opening means comprises a cam rod extending the length of said clamp member within the longitudinally extending hole, said rod being provided with a cam area at each end; and said body portion has a cam drive area abutting each cam area of said cam rod; whereby said clamp member is drivable, under control of the positioning of said cam rod, away from said body portion for card loading.

4. A drum as described in claim 1, wherein said body portion contains, in a longitudinal hole parallel to its axis substantially opposite the cutout portion, a balance rod to help support the structure and to balance the additional weight of said clamp member.

5. A drum as described in claim 1, comprising in addition a pair of locking rings disposed at its ends, each locking ring having a relieved portion to allow movement of said clamp member for loading, and a cam portion at a locking position to lock said clamp member on the card, said cam portion having the high dwell at the end opposite the direction of drum rotation, whereby the inertia of said locking ring will tend to keep it locked.

6. A drum as described in claim 1, wherein said body portion is equipped with a plurality of punch-shaped projections at predetermined locations, whereby a scan card punched in punch positions corresponding to such predetermined locations may be registered prior to being clamped in place on the drum.

7. A drum as described in claim 6, wherein said punch-shaped projections are separately mountable, each having its own pin for attachment to said body portion which is slotted in predetermined positions, the slots being the width of the punch-shaped projection to be used for registration, and said body portion is drilled within the bounds of each slot, for insertion of the attachment pin of one of said punch-shaped projections.

8. A drum for holding a card for repetitive parallel scanning, comprising: a shaft; a plurality of commutator rings insulatedly mounted on said shaft; an incomplete-cylindrical body portion around which the scan card may be wrapped, such body portion having a core of insulating material disposed about the axis of rotation in cylindrical fashion, having a plurality of conductive surfaces disposed on said core, having a longitudinal cutout portion bounded by terminal edges against which portions of the margins of the scan card fall when the card is registered, and having a plurality longitudinal slots; a plurality of wires in respective slots connecting said commutator rings to associated conductive surfaces; a clamp member to clamp the scan card margin portions to the terminal edges of said body portion, said clamp member having an exterior surface formed to complete a cylinder with the scan card; means to hold said clamp member in clamping position; and means to position said clamp member away from said body portion for loading the scan card.

9. A drum for holding a card for repetitive parallel scanning, comprising: a shaft; an incomplete-cylindrical body portion around which the scan card may be wrapped, having a longitudinal cutout portion bounded by terminal edges against which portions of the scan card fall when the card is registered; a clamp member to clamp the scan card to the terminal edges of said body portion, said clamp member having an exterior surface formed to complete a cylinder with the scan card; means to bias said clamp member toward clamping position; means to position said clamp member away from said body portion for loading; a pair of locking rings each having a relieved area to allow said clamp member to be positioned for loading and each having a locking area to provide a positive lock of said card on said drum; a plurality of locating pins for registering the scan card; and means to balance the drum.

10. A drum for holding a card for repetitive parallel scanning, comprising: a shaft; an incomplete-cylindrical body portion around which the scan card may be wrapped, having a longitudinal cutout portion bounded by terminal edges against which portions of the longitudinal margins of the scan card fall when the card is registered; a clamp member to clamp the scan card margin portions to the terminal edges of said body portion, said clamp member having an exterior surface formed to complete a cylinder with said scan card, and having a plurality of longitudinal recesses, means to bias said clamp member toward said body portion; a plurality of cam rods each having a plurality of cam surfaces, said cam rods extending substantially the length of the longitudinal recess in said clamp member; and a plurality of cam driver surfaces disposed on said body portion to react with said cam surfaces, whereby the human operator, by positioning the cam rods, may cause the clamp to open for loading or to close and clamp a scan card to said drum.

11. A scanner drum attachment for use with a sorter comprising: a mounting base; a gear train to drive the card on the drum past its reading means synchronously with the driving by the sorter of each card past its reading means; a shaft driven by said gear train; an incomplete-cylindrical body portion around which the scan card may be wrapped, having a longitudinal cutout portion bounded by terminal edges against which portions of the leading edge and trailing edge of the scan card fall when the card is registered; a clamp member to clamp the scan card margin portions to the terminal edges of said body portion, such clamp member having an exterior surface formed to complete a cylinder with said scan card, and having a plurality of longitudinal recesses; means to bias said clamp member toward said body portion; a plurality of cam rods extending substantially the length of said clamp member within the longitudinal recesses; a plurality of cam driver surfaces on said body portion; and a plurality of cam surfaces on each of said cam rods to react with said driver surfaces on said body portion, whereby the human operator, by positioning the cam rods, may cause the clamp to open for loading or to close and clamp a scan card to said drum.

No references cited.